United States Patent [19]

Barbier

[11] 4,002,846
[45] Jan. 11, 1977

[54] MULTIPLEXED DIGITAL TRANSMISSION SYSTEM WITH MEANS FOR CHANNEL INSERTION AND EXTRACTION

[75] Inventor: Xavier N. Barbier, Plessis Trevise, France

[73] Assignee: Societe Anonyme de Telecommunications, Paris Cedex, France

[22] Filed: Dec. 22, 1975

[21] Appl. No.: 643,001

[30] Foreign Application Priority Data

Dec. 31, 1974 France .............................. 74.43511

[52] U.S. Cl. ........................ 179/15 BD; 179/15 BY
[51] Int. Cl.² ............................................ H04J 3/08
[58] Field of Search ...... 179/15 BD, 15 BY, 15 BS, 179/15 AD; 325/4; 178/71 B, 71 A

[56] References Cited

UNITED STATES PATENTS

| 3,040,130 | 6/1962 | Hughes | 179/15 BD |
| 3,772,475 | 11/1973 | Loffreda | 179/15 BS |
| 3,922,493 | 11/1975 | Brenig | 179/15 BY |

OTHER PUBLICATIONS

Telecommunications, Sept. 1973, pp. 41–44, "Single Channel Drop and Insert" by Canadian Marconi Co.

*Primary Examiner*—David L. Stewart

[57] ABSTRACT

Time multiplexed data transmission system in which P.C.M. data words (bytes) derived from speech signals of telephone component channels (telephone inputs) and P.C.M. signalling words derived from the signalling state of said telephone component channels (inputs) are respectively time multiplexed in data time slots and signalling time slots of a frame to form a composite multiplex channel or frame. The signalling time slots of successive frames form a multiframe format. In the intermediate stations inserted along the transmission path over which the resultant multiplex frame is transmitted, the input channel data and signalling states can be extracted or inserted. Each intermediate station comprises a device reconstituting (regenerating) the incident frame and a local frame time base, self driven and synchronized by the incident frame reconstituting device. The contents of incomng data time slots and signalling time slots are stored in a frame memory. Writing in this frame memory is controlled by the incident frame reconstituting device and reading out from the frame memory is controlled by the local frame time base, which also selectively controls the extraction or maintaining of the component inputs data from or in the resultant multiplex frame. The local frame time base directs the signalling words to a multiframe memory and a local multiframe time base driven by the local frame time base selectively controls the extraction or maintaining of the signalling words from or in the resultant multiplex frame.

3 Claims, 1 Drawing Figure

MULTIPLEXED DIGITAL TRANSMISSION SYSTEM WITH MEANS FOR CHANNEL INSERTION AND EXTRACTION

BACKGROUND OF THE INVENTION

1. Field of the Invention

The present invention relates to a system of transmission of multiplexed digital data according to a time frame and, more particularly, to such a transmission system wherein a plurality of component digital channels forming a resulting multiplex digital channel and conveying data digital signals and signalling digital signals may be extracted from this resulting multiplex digital channel or may be inserted therein.

2. Description of the Prior Art

Multiplexed digital data transmission systems are known in which data transmission takes place from a transmission station towards a reception station through one or several intermediate stations. In this case, some data are taken from the frame entering into an intermediate station and some other data re-inserted in the frame at the intermediate station lead out. It is well to remember here that each data channel occupies a well-defined time slot in the frame, the time slot number being defined in relation to a specific signal called frame locking signal or word which is repeated periodically in the transmitted signal. The interval between the start of a locking word and the start of the following locking word defines the frame length. For example, for the transmission of telephone channels within a PCM system at a rate of 2.048 Megabits per sec, a 125 microsecond frame divided into 32 time slots (TS) is used, and the first time slot $TS_0$ is assigned to the frame locking word, the 17th time slot $TS_{16}$ is assigned to the transmission of signalling signals and the thirty others are assigned each, respectively, to a telephone channel. Each of these 32 time slots contains eight bits forming octets. The time slot $TS_{16}$ contains two signalling half-octets transmitting the signalling of two telephone channels. The signalling time slots $TS_{16}$ of 16 successive frames are arranged in a multiframe. The first time slot of the multiframe contains a multiframe locking signal and possibly an alarm signal, and the fifteen other time slots of the multiframe contain 30 half-octets associated with the 30 telephone channels. If $TS_{16,i}$ is a time slot of the multiframe ($0 \leq i \leq 15$), this time slot contains the signalling half-octets of channel $i$ and channel ($i+16$).

A system of insertion and extraction into and from one or several data component channels of a multiplex data resulting channel has been disclosed my copending Application Ser. No. 595,170 filed July 11, 1975 and partially assigned to the same assignee as the present invention. It includes means to implement the phasing of the frame entering the station with a locally generated frame. This phasing requires the use of a variable delay circuit, such delay being at least equal to the duration of a frame. This delay circuit could either be constituted by a shift register or by a random access memory.

When the signals to transfer are represented only by data that are not associated with any signalling signal, the time slots $TS_{16}$ are not endowed with any specific signification and all that is required is to phase-set the incident frame and the frame generated by the intermediate station. But in the case of a telephone channel transfer, it is necessary to transfer the data contained in the time slot assigned to said telephone channel as well as the signalling signals related to this specific telephone channel and contained in the assigned $TS_{16}$. To do so, it is necessary to phase-in the incident multiframe composed of 16 frames and the multiframe generated by the intermediate station.

An obvious procedure would be to use for the multiframe phasing-in a variable delay circuit such as that used for the frame phasing-in. This solution would lead for instance, still in the case of a rate of 2.048 Megabits per second, to the use of a shift register with a capacity of 4096 bits which would be prohibitive.

OBJECTS OF THE INVENTION

The object of the present invention is to implement the phasing-in or synchronization of the incident multiframe transmitted by the originating station with the multiframe transmitted by the intermediate station without using a shift register or a memory with such large capacity, as above mentioned.

SUMMARY OF THE INVENTION

Pursuant to the object of the invention invention, and to achieve this purpose in an intermediate station, after phasing-in the incident and the locally generated frames, the bits of the signalling signals contained in the incident multiframe are stored in a system which is designed so as to be read out at the adequate time slot of the locally generated multiframe.

The device pursuant to the invention uses therefore a first variable delay circuit, on the one hand, whose maximum required length is that of the frame and which receives all the bits contained in said frame, and a second variable delay circuit, on the other hand, whose maximum required length is equal to half of the frame length and which only receives the bits of the signalling signals. Said first and second delay circuit being advantageously constituted by either shift registers or random access memories.

Still using the selected instance with a 2.048 Megabits per sec rate multiplex channel, the capacity required for the first shift register, or random access memory, would be 256 bits and that of the second shift register, or random access memory, would be 128 bits.

The main advantage of the multiplex digital transmission system of the invention resides in the fact that phasing-in, in an intermediate station, of the incident frame and multiframe with the frame and multiframe that are locally generated prevents disturbances occurring on the input side of the said intermediate station from affecting transmission taking place on the output side of the same station.

Another advantage of this multiplex digital transmission system resides in the fact that phasing-in of the incident and locally generated multiframes is done by using a delay circuit of a length that is much shorter than the multiframe length.

BRIEF DESCRIPTION OF THE DRAWING

Other features and advantages of the present invention will best be evidenced upon a study of the following specification taken in connection with the accompanying single FIGURE which is a block diagram representing the data transmission system of the invention.

DESCRIPTION OF THE PREFERRED EMBODIMENT

Figure 1:
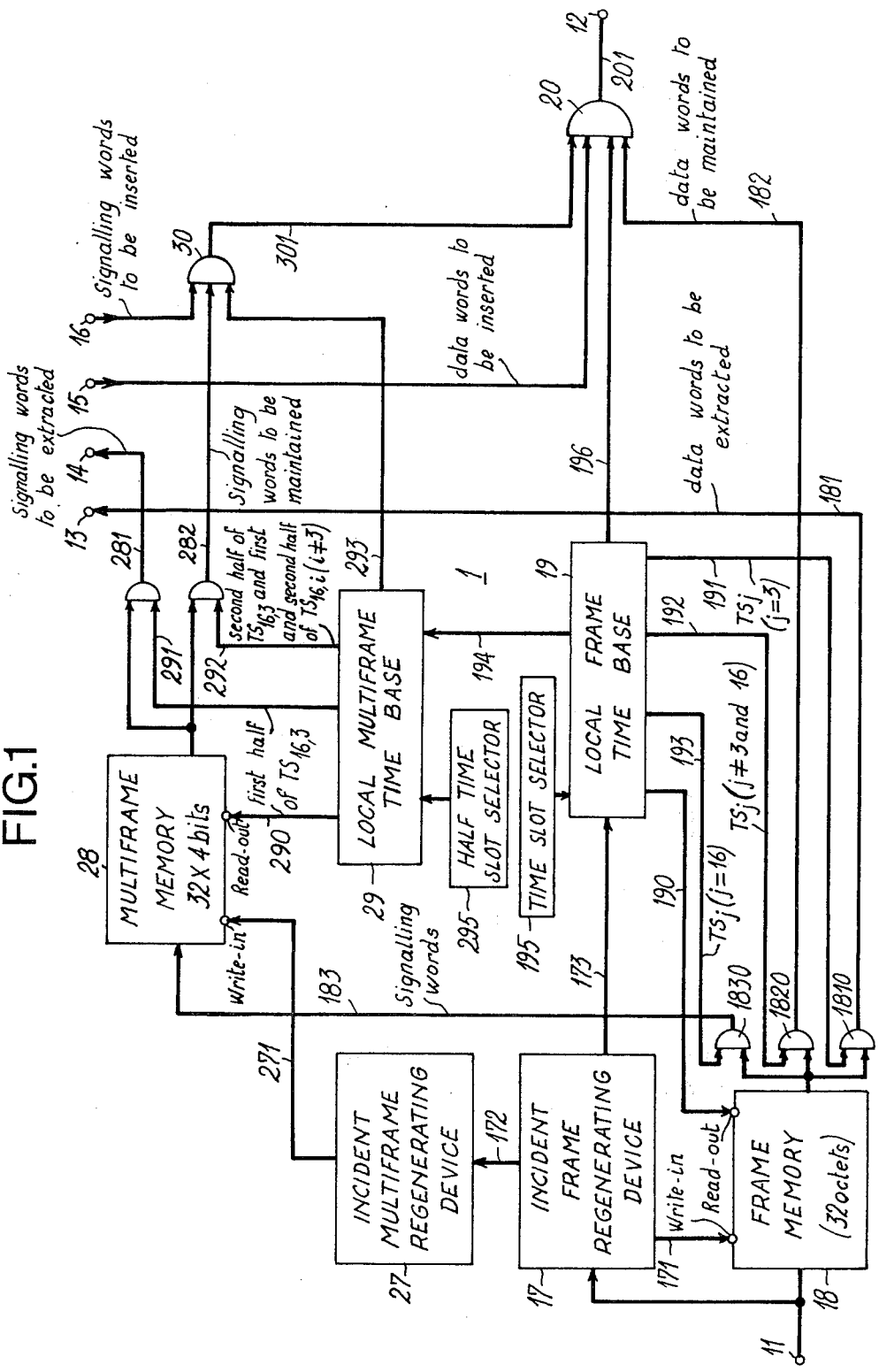

In this single figure, in block diagram form, the intermediate station 1 receives at its input terminal 11 a digital signal that is multiplexed as per a frame and a multiframe, and transmits to its output terminal 12 a signal of the same kind but with a different composition because some component channels which exist in the input frame are extracted in station 1 and some new component channels are inserted in the output frame within idle time slots. The inserted component channels can thus be substituted to extracted component channels, but of course it is not necessary that the number of inserted and extracted component channels be equal. Output terminals 13 and 14 relate to data and signalling, respectively, of an extracted component channel, and input terminals 15 and 16 relate to data and signalling, respectively, of an inserted component channel.

Station 1 includes, as it has become known from the previously-indicated patent application, a device for the regenerating of the incident frame and remote clock 17, a memory 18 of 32 octets, and a local frame time base 19. The incident frame regenerating device 17 controls, through connection 171, the write-in addressing of memory 18 and, through connection 173, the synchronization of local frame time base 19. The local frame time base 19 controls, through connection 190, the read-out addressing of memory 18 for data octets emerging, through connections 181 or 182, depending on whether these octets are to be extracted or to be maintained in the frame, or signalling octets emerging through connection 183. Represented and AND gates 1810, 1820, 1830 controlled by local frame time base 19 to switch the read-out octets towards the appropriate output connection.

In addition to circuits 17, 18 and 19 which already exist in known state-of-the-art digital transmission systems, the intermediate station includes a system for the regeneration of the incident multiframe 27, a memory 28 with 16 octets, and a local multiframe time base 29. The system for the regenerating of the incident multiframe 27 is controlled by the incident frame regenerating device 17, through connection 172, and the local multiframe time base 29 is controlled by the local frame time base 19, through connection 194.

The output connection 183 of memory 18, where the octets of the $TS_{16}$ time slots are gathered, is connected to the memory 28 input terminal. The incident multiframe regenerating device 27 controls, through connection 271, the write in addressing of memory 28 and the local multiframe time base 29 controls, through connection 290, the read out addressing of memory 28.

Memory 28 contains the 16 octets of the slots $TS_{16}$ in the form of 32 words of 4-bits corresponding each to a half-octet. Readout of memory 28 is done by half-octet and read-addressing is done, either through connection 291 regarding one or several half-octets to extract, or through connection 292 regarding half-octets to maintain in the multiframe.

The lead from signalling input terminal 16, the lead 282 from multiframe memory 28, and the lead 293 transmitting the multiframe clock signal provided by the local multiframe time base 29, are connected to an insertion device 30, such as an AND gate. The output lead 301 of AND gate 30, the lead from data input terminal 15, the lead 182 from frame memory 18, and lead 196 transmitting the frame clock signal provided by the local frame time base 19 are connected to an insertion device 20 such as an AND gate. The output lead 201 of AND gate 20 is connected to output terminal 12 of the intermediate station.

As an example, let us say here that channel No. 3 assigned to the time slot $TS_3$ of the frame is to be extracted in the intermediate station 1 and that a new channel No. 25 assigned to the time slot $TS_{25}$ of the frame is to be inserted in this same station. Channel No. 3 signalling is to be found in the first half-octet $TS_{16,3}$ of the multiframe and channel No. 25 signalling is to be found in the second half-octet $TS_{16,9}$ of the multiframe. The local frame time base 19 controls the readout moment of the octet in time slot $TS_3$ from memory 18, through connection 190, and directs the read octet towards the output terminal 13, through AND gate 1810 and connection 181. The same local frame time base 19 directs the octets in the time slots $TS_{16,i}$, through AND gate 1830 and connection 183, towards the multiframe memory 28, and more particularly the octet in time slot $TS_{16,3}$. This octet, related to channel No. 3 and channel No. 19 signalling, is stored in the third and fourth four bit words or half-octets of memory 28. The local multiframe time base 29 controls the readout moment of the first half-octet in time slot $TS_{16,3}$ from memory 28 through connection 290, and directs this half-octet through connection 281, towards output terminal 14. The other half-octets are directed, through connection 282, towards AND gate 30.

The insertion of the half-octet representing the signalling of channel No. 25 into the second half of time slot $TS_{16,9}$ of the multiframe (this half time slot being assumed to be free) is done thanks to AND gate 30 and the insertion of the octet representing the data of channel No. 25 into time slot $TS_{25}$ of the frame is done thanks to AND gate 20. In the case of the example, the local multiframe time base 29 applies gating pulses having the duration of half a time slot to leads 290 and 291 as regards to those of the signalling half-octets which are to be extracted through lead 281 and to lead 292 as regards to those of the signalling half-octets which are to be maintained in the multiframe through lead 282. According to the example, gating pulses coinciding with the first half of time slot $TS_{16,3}$ are applied to leads 290 and 291 and gating pulses coinciding with the second half of time slot $TS_{16,3}$ and to the first and second halves of time slots $TS_{16,i}$ with $i \neq 3$ are applied to lead 292. A half time slot selector 295 is associated to local multiframe time base 29 to direct the gating pulses to the appropriate leads according to the number of the signalling half octets extracted from or maintained in the multiframe.

Similarly a time slot selector 195 is associated to local frame time base 19 to direct the gating pulses to lead 191 as regards to those of the data octets which are to be extracted through lead 181 and to lead 192 as regards to those of the data octets which are to be maintained in the frame through lead 182.

Until this moment, we have described the circuits which correspond to a single transmission direction in the intermediate station 1. The other transmission direction includes another frame memory 18, another incident frame regenerating device 17, another incident multiframe regenerating device 19, and another multiframe 28 memory, but in this station there is only a single local frame time base 19 that is rhythmically synchronized by means of one or the other incident frame regenerating devices, as they relate to both transmission directions, and a single local multiframe time base 29 controlled by the single local frame time base 19.

What I claim is:

1. A multiplex digital transmission system comprising:
  a multiplex channel comprising a plurality of digital component channels;
  each of said component channels conveying data information and signalling information;
  the data information of said digital component channels being time multiplexed in time slots containing data words and forming a frame;
  the signalling information of said component channels being time multiplexed in time slot parts containing signalling words and forming a multiframe;
  a plurality of component channel extraction and insertion stations located along the transmission path of the system channels;
  each of said extraction and insertion stations having an input, an output, a particular insertion input and a particular extraction output;
  means in each of said stations for reconstituting the frame of the incoming multiplex digital channel connected to said input of said extraction and insertion station;
  means driven by said frame reconstituting means for reconstituting the multiframe of the incoming multiplex channel;
  a data and signalling word store, a write addressing means for the data word and a signalling word store all controlled by said frame reconstituting means;
  a signalling word store and a write addressing means controlled by said multiframe reconstituting means;
  a self driven local frame time base synchronized by said frame reconstituting means;
  means controlled by said local frame time base to selectively direct the words stored in said data word and signalling word store to said signalling word store;
  a multiframe time base driven by said self driven local frame time base;
  means for selectively directing parts of the signalling words stored in said signalling word store to the output of said multiplex channel and to the particular extraction output of the corresponding component channel; and,
  means for inserting in the output of the multiplex channel data words and signalling words applied to the input of the particular insertion means of the digital component channels.

2. A multiplex digital transmission system comprising:
  a multiplex channel comprising thirty digital component channels;
  each of said component channels conveying data information and signalling information;
  the data information of said thirty digital component channels being time multiplexed respectively in 30 data time slots of a 32 time slot frame;
  each of said 30 data time slots containing a 8-bit data word and the signalling information of said 30 digital component channels being time multiplexed in 16 signalling time slots respectively located in 16 successive frames and forming a multiframe;
  each of said signalling time slots containing two 4-bit signalling words and component channel extraction and insertion stations located along the transmission path of the system channels;
  each of said extraction and insertion stations having an input, an output, a particular insertion input and a particular extraction output;
  means in each of said stations for reconstituting the frame of the incoming multiplex digital channel connected to said input of said extraction and insertion stations;
  means driven by said frame reconstituting means for reconstituting the multiframe of said incoming multiplex channel;
  a data and signalling word store, a write addressing means for the data word and signalling word store all controlled by said frame reconstituting means;
  a signalling word store and a write addressing means controlled by said multiframe reconstituting means;
  a self driven local frame time base synchronized by said frame reconstituting means;
  means controlled by said local frame time base to selectively direct the 8-bit words stored in said data word and signalling word store to said signalling word store;
  a multiframe time base driven by said self driven local frame time base;
  means for selectively directing the 4-bit signalling words stored in said signalling word store to the output of said multiplex channels and particular extraction output of the corresponding component channel; and,
  means for inserting in the output of the multiplex channel data words and signalling words applied to the input of the particular insertion means of the digital component channels.

3. A system of multiplex digital transmission as claimed in claim 2, in which the data word and signalling word store has a capacity of 256 bits and the signalling word store has a capacity of 128 bits.

* * * * *